United States Patent
Dhoolia et al.

(10) Patent No.: US 9,311,081 B2
(45) Date of Patent: Apr. 12, 2016

(54) GENERATING AND EMPLOYING OPERATIONAL ABSTRACTIONS OF TRANSFORMS

(71) Applicant: International Business Machines Corporation, Armonk, NY (US)

(72) Inventors: Pankaj Dhoolia, Indirapuram (IN); Senthil Kumar Kumarasamy Mani, Gurgaon (IN); Saurabh Sinha, Bangalore (IN); Vibha Singhal Sinha, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 64 days.

(21) Appl. No.: 13/656,637

(22) Filed: Oct. 19, 2012

(65) Prior Publication Data
US 2014/0115558 A1 Apr. 24, 2014

(51) Int. Cl.
*G06F 9/44* (2006.01)

(52) U.S. Cl.
CPC ... *G06F 8/74* (2013.01); *G06F 8/10* (2013.01)

(58) Field of Classification Search
None
See application file for complete search history.

(56) References Cited

U.S. PATENT DOCUMENTS

| | | | |
|---|---|---|---|
| 8,042,091 B2 | 10/2011 | Koehler et al. | |
| 8,145,468 B2 | 3/2012 | Fritzsche et al. | |
| 8,170,841 B2 | 5/2012 | Pinto et al. | |
| 2009/0150855 A1 | 6/2009 | Elaasar | |
| 2011/0314337 A1 | 12/2011 | Sinha et al. | |
| 2012/0047391 A1 | 2/2012 | Dhoolia et al. | |
| 2012/0110545 A1 | 5/2012 | Jerman et al. | |
| 2013/0338980 A1* | 12/2013 | Paul et al. | 703/6 |

OTHER PUBLICATIONS

Siddiqui, Farheen, et al., "Aspect Weaving in MDA for Ontology Modelling", Second International Conference on Computer Engineering and Applications, Mar. 26-29, 2010, Bali Island, Indonesia, 5 pages, Crown Publishing Group, New York, NY, USA.

Estevez, E., et al., "Modeling and Validation based on Manufacturing Standards", 9th IEEE International Conference on Industrial Informatics (INDIN), Jul. 26-29, 2011, Caparica, Lisbon, pp. 199-204, IEEE Digital Library.

Amrani, Moussa, et al., "A Tridimensional Approach for Studying the Formal Verification of Model Transformations", IEEE Fifth International Conference on Software Testing, Verification and Validation (ICST), Apr. 17-21, 2012, Montreal, QC, Canada, pp. 921-928, IEEE Digital Library.

* cited by examiner

*Primary Examiner* — Li B Zhen
*Assistant Examiner* — Amir Soltanzadeh
(74) *Attorney, Agent, or Firm* — Ference & Associates LLC

(57) ABSTRACT

Methods and arrangements for employing a software model transform. A software model transform is accepted, and the transform is manipulated to obtain a transform representation. At least one functional path is explored with respect to the transform representation. A trace is conducted of at least one explored path, and an abstraction of the transform is produced via utilizing the trace, the abstraction comprising a simplified semantic view of the transform.

11 Claims, 11 Drawing Sheets

$$T ::= T O_F \mid O_F$$
$$O_F ::= \psi\{O_F\}^* \mid G\{O_F\} \mid O_F \vee O_F \mid T_F$$
$$T_F ::= l \mid \psi \mid T_F \mid T_F \psi$$
$$G ::= \psi \mid \approx l \mid \psi \approx l \mid \psi \mid G \wedge G$$
$$\approx\;::=\;=\;\mid\;\neq\;\mid\;<\;\mid\;\leq\;\mid\;>\;\mid\;\geq$$

where $O_F$ is an output fragment, $T_F$ is a text fragment, $G$ is a relational expression (or guard), $\psi$ is a metamodel access path, and $l$ is a string literal.

Abstraction Representation

/ 437

```
1.  ψ₁{
2.     "--- User ---\n"
3.     user.first" "G₁{user.middle" "}user.last"\n"
4.     G₂{"--- Children ---\n"
5.         ψ₂{
6.             user.children.user.first
7.                 G₃{user.children.user.middle }
8.                 user.children.user.last"\n"
9.             G₄{"Boy "user.children.user.age} ∨
10.            ¬G₄∧G₅{"Girl "user.children.users.age}"\n"
11.        }
12.        [*
13.            G₆{"User has children\n"}
14.        ]*
15.    }
    ψ₁: userData
    G₁: userData.user.hasMiddle = true
    G₂: userData.user.children ≠ null
    ψ₂: userData.user.children
    G₃: userData.user.children.user.hasMiddle = "true"
    G₄: userData.user.children.user.gender = "M"
    G₅: userData.user.children.user.gender = "F"
    G₆: userData.user.children.user.length > 0
```

Transform Abstraction

/ 409

Sample Transform

```
1.  function main() {
2.     foreach user r in userData do
3.         print("--- User ---\n")
4.         call printName(r)
5.         totalChildren = 0
6.         if r.children != null then
7.             totalChildren = r.children.users.length
8.             print("--- Children ---\n")
9.             foreach user c in r.children do
10.                call printName(c)
11.                if c.gender = "M" then
12.                    print("Boy ", c.age)
13.                else if c.gender = "F" then
14.                    print("Girl ", c.age)
15.                endif
16.            endfor
17.            print("\n")
18.        endif
19.        if totalChildren > 0 then
20.            print("User has children\n")
21.        endif
22.    endfor
    }
    function printName(User user) {
18.    print(user.first + " ")
19.    if user.hasMiddle = "true" then
20.        print(user.middle + " ")
21.    endif
22.    print(user.last)
    }
```

```
1.  <DataTaint select="first">
2.    <taint parentNode="user" currentNode="user.first"/>
3.  </DataTaint>
4.  <DataTaint literal=""/>
5.  <ControlTaint stmt="19" branch="T"
6.    op="==" rValue="true">
7.    <left select="hasMiddle"><taint parentNode="user"
8.      currentNode="NULL" /></left>
9.    <DataTaint select="middle">
10.     <taint parentNode="user" currentNode="user.middle"/>
11.   </DataTaint>
12.   <DataTaint literal=""/>
13. </ControlTaint>
14. <DataTaint select="last">
15.   <taint parentNode="user" currentNode="user.last"/>
16. </DataTaint>
```
— 607

FIG. 6

GENERATING AND EMPLOYING OPERATIONAL ABSTRACTIONS OF TRANSFORMS

BACKGROUND

In model driven engineering, formal models are fundamental software artifacts that are created and manipulated using automated transforms. Generally, model transforms represent a class of applications that transform a structured input to a structured or text output. The input models to such transforms are often large and complex. Such transforms are typically built-in and prepackaged in various modeling tools.

Generally, transform end-users need to understand the semantics of a transform to use it effectively, but without having to examine the transform implementation. As such, a transform is typically used as a "black-box" by end-users, and often, end-users lack the expertise to understand the implementation details

BRIEF SUMMARY

In summary, one aspect of the invention provides a method of employing a software model transform, the method comprising: utilizing a processor to execute computer code configured to perform the steps of: accepting a software model transform; manipulating the transform to obtain a transform representation; exploring at least one functional path with respect to the transform representation; conducting a trace of at least one explored path; and producing an abstraction of the transform via utilizing the trace, the abstraction comprising a simplified semantic view of the transform.

Another aspect of the invention provides an apparatus for employing a software model transform, the apparatus comprising: at least one processor; and a computer readable storage medium having computer readable program code embodied therewith and executable by the at least one processor, the computer readable program code comprising: computer readable program code configured to accept a software model transform; computer readable program code configured to manipulate the transform to obtain a transform representation; computer readable program code configured to explore at least one functional path with respect to the transform representation; computer readable program code configured to conduct a trace of at least one explored path; and computer readable program code configured to produce an abstraction of the transform via utilizing the trace, the abstraction comprising a simplified semantic view of the transform.

An additional aspect of the invention provides a computer program product for employing a software model transform, the computer program product comprising: a computer readable storage medium having computer readable program code embodied therewith, the computer readable program code comprising: computer readable program code configured to accept a software model transform; computer readable program code configured to manipulate the transform to obtain a transform representation; computer readable program code configured to explore at least one functional path with respect to the transform representation; computer readable program code configured to conduct a trace of at least one explored path; and computer readable program code configured to produce an abstraction of the transform via utilizing the trace, the abstraction comprising a simplified semantic view of the transform.

A further aspect of the invention provides a method comprising: accepting a software model transform; manipulating the transform to obtain a raw transform representation; conducting forced path exploration with respect to at least one functional path found in the raw transform representation; producing a taint log via conducting a trace of at least one explored path; and producing an abstraction of the transform via utilizing the taint log, the abstraction comprising a simplified semantic view of the transform.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 illustrates a sample transform with its corresponding transform abstraction and abstraction representation.

FIG. 6 provides a sample taint log.

DETAILED DESCRIPTION

Figure 1:
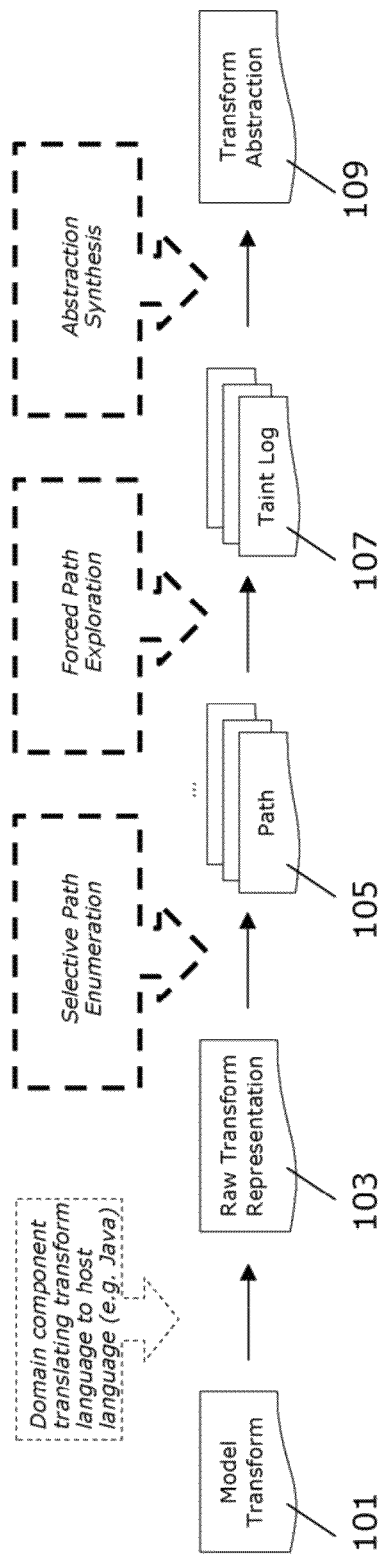
FIG. 1 schematically illustrates a method of transform abstraction.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-9. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 11. In accordance with an example embodiment, most if not all of the process steps, components and outputs discussed with respect to FIGS. 1-9 can be performed or utilized by way of a processing unit or units and system memory such as those indicated, respectively, at 16' and 28' in FIG. 11, whether on a server computer, a client computer, a node computer in a distributed network, or any combination thereof.

In accordance with at least one embodiment of the invention, it is recognized that a succinct, intuitive, and complete operational abstraction of transform semantics can be valuable in facilitating various applications related to a transform (e.g., comprehension, debugging, foot-printing, test-input generation, model & meta-model enrichment/refinement, model & meta-model—critical and forgiving region identification, etc.). Broadly contemplated herein are methods and arrangements that are able to abstract the essential transformation semantics from a transform user's perspective, i.e., in terms of the structure of the output and the influence of input-model elements on output fragments, as well as leverage such an abstraction to support the applications related to the transform.

Broadly contemplated herein, in accordance with at least one embodiment of the invention, are dynamic analysis-based techniques for constructing operational abstractions of transforms. Generally the abstraction construction is the enumeration of transform paths that are relevant for analysis, the analysis of individual paths to compute relevant information (such as how input-model entities are accessed and propagated to the output) and the composition and consolidation of path-specific information in a manner to synthesize an operational abstraction from a transform user's perspective (i.e., in terms of the structure of the output and the influence of input-model elements on output fragments). Among the many viable applications which can employ such an operational abstraction are (while not at all being limited to): transform comprehension; transform debugging; test input generation; transform foot-printing; model and meta-model enrichment/refinement; and model and meta-model critical/forgiving region identification.

As generally understood herein, in accordance with at least one embodiment of the invention, a transform abstraction captures the essential transformation semantics in terms of the structure of the output and the influence of input-model elements on output fragments. Transform comprehension, from a transform user's perspective, relates to understanding those input models that might need to be created to generate a desired output. With an erroneous output location considered, transform debugging serves to determine what input-model elements influenced the erroneous outcome, and what changes could be made to the input to generate desired output at that location. Test input generation, based on specified testing criteria (such as transform path coverage), relates to automatically generating test input that will exercise specified criteria. A transform footprint represents a subset of input meta-model/model elements that are accessed by the transform. Meta-model enrichment or refinement relates to identifying the constraints implicitly observed in the transform, and enriching the meta-model to make those constraints explicit in the schema. Critical/forgiving region identification relates to identifying "forgiving input regions" as ones where small changes induce correspondingly small changes in the output behavior and "critical input regions" as ones where small changes can cause dramatic changes in the output behavior.

As generally understood herein, in accordance with at least one embodiment of the invention, forced path exploration works by modifying the outcome of a conditional statement, at runtime, to guide the execution along a specific branch from the conditional. A hammock graph is a sub-graph of a control flow graph with a unique entry node (e) (included in the path) and exit node (x) such that all incoming edges to the hammock path enters though the entry node (e), and all outgoing edges from the hammock path exits through the exit node (x). Peer-level hammocks can be defined as follows: let $\{H_1, H_2, \ldots, H_k\}$, (k>1), be a set of hammocks with entry nodes $e_1, e_2, \ldots, e_k$. The hammocks in the set are peer-level hammocks if and only if the $e_i$, (1≤i≤k), have the same control dependence. A taint log represents meta-data captured, for every hammock path explored, in terms of the input model elements which are either directly or indirectly (through conditions and loop) responsible for output generation.

In accordance with at least one embodiment of the invention, a method of transform abstraction is illustrated schematically in FIG. 1. As shown, a software model transform 101 undergoes a change wherein a domain component translates a transform domain language (e.g., XSLT, JET, MOFM2T) into a host language (e.g., Java), resulting in a raw transform representation 103. Thence, in a process of selective path enumeration, paths 105 with independent single peer hammocks are explored one at a time. Forced path exploration then yields a taint log 107, which represents a trace of each path with loop, data and control taint information. A process of abstraction synthesis then yields the transform abstraction 109 itself, which includes transformation semantics conveying both output and the influence of input on output fragments.

Figure 2:
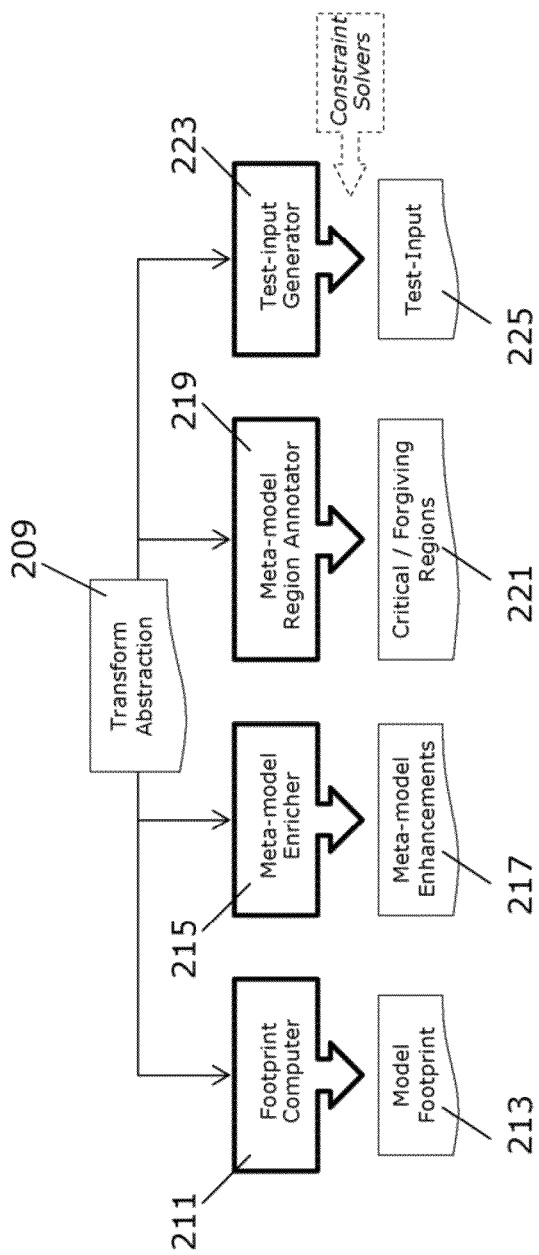
FIG. 2 schematically illustrates a method of transform abstraction usage.

In accordance with at least one embodiment of the invention, a method of transform abstraction usage is illustrated schematically in FIG. 2. As shown, a transform abstraction 209 can be employed by a footprint computer 211 to generate a model footprint 213, by a meta-model enricher 215 to generate meta-model enhancements 217, by a meta-model region annotator 219 to identify critical or forgiving regions 221 and a test-input generator 223 to generate test input 225. In each case, constraint solvers can be applied to the transform abstraction to yield the different types of output shown.

Figure 3:
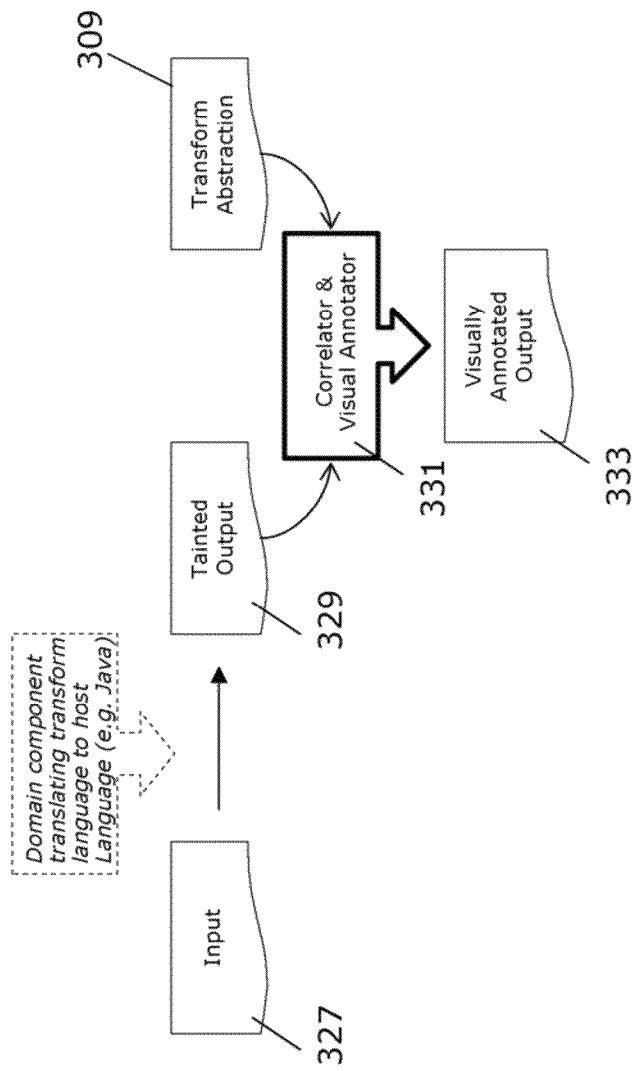
FIG. 3 schematically illustrates a method of facilitating visual transform comprehension.

In accordance with at least one embodiment of the invention, a method of facilitating visual transform comprehension is illustrated schematically in FIG. 3. As shown here, if input 327 yields tainted output 329 (e.g., in the course of translating transform domain language to a host language such as Java), a transform abstraction 309 can be employed in a correlator and visual annotator 331 to create visually annotated output 333.

FIG. 4 illustrates, in accordance with at least one embodiment of the invention, a sample transform (expressed in pseudo-code) 435 with its corresponding transform abstraction 409 and abstraction representation 437.

Figure 5:
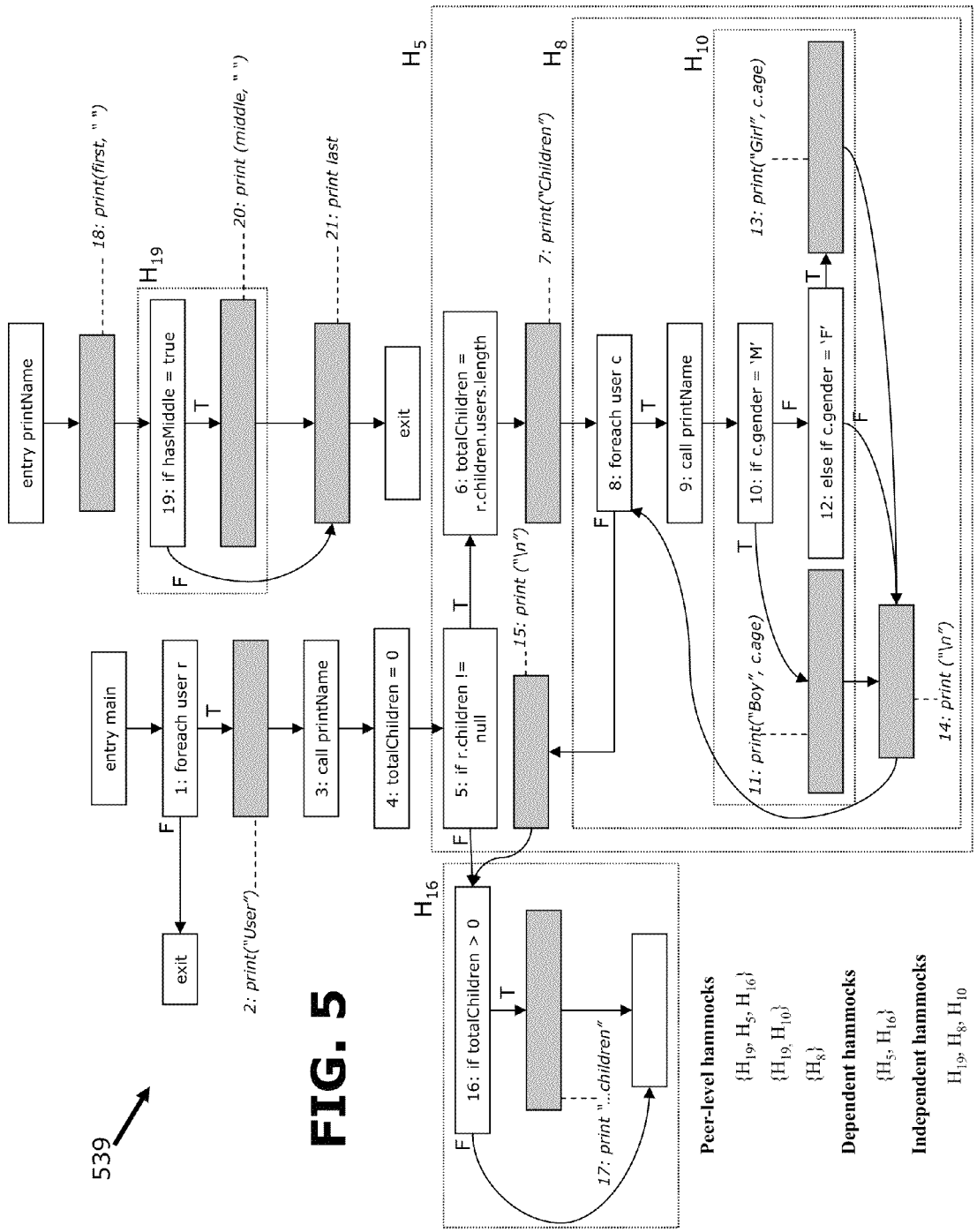
FIG. 5 schematically illustrates a control-flow graph for the sample transform of FIG. 4.

FIG. 5 schematically illustrates, in accordance with at least one embodiment of the invention, a control-flow graph 539 for the sample transform 435 of FIG. 4. Five hammocks labeled with hammock entry nodes in the CFGs (control-flow graphs) are highlighted to illustrate hammock classification, with the shaded nodes representing output.

FIG. 6 provides, in accordance with at least one embodiment of the invention, a sample taint log 607 generated along the sample transform sub-path of FIG. 5 indicated at steps 18, 19, 20 and 21.

Figure 7:
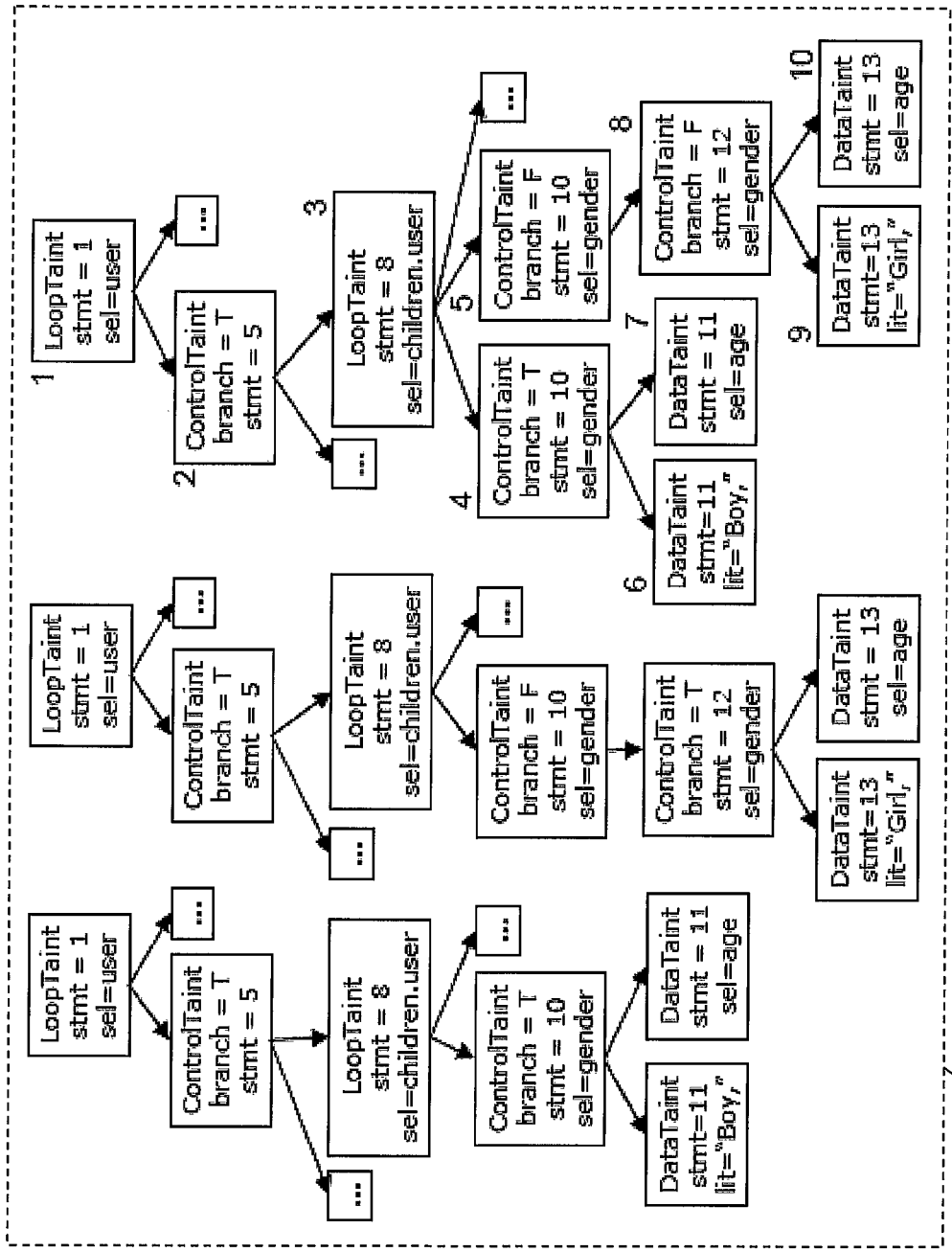
FIG. 7 schematically illustrates a merging of individual traces during abstraction synthesis.

FIG. 7 schematically illustrates a merging 741 of individual traces during abstraction synthesis, wherein the traces at the left and center of FIG. 7 are merged to form the trace on the right.

Figure 8:
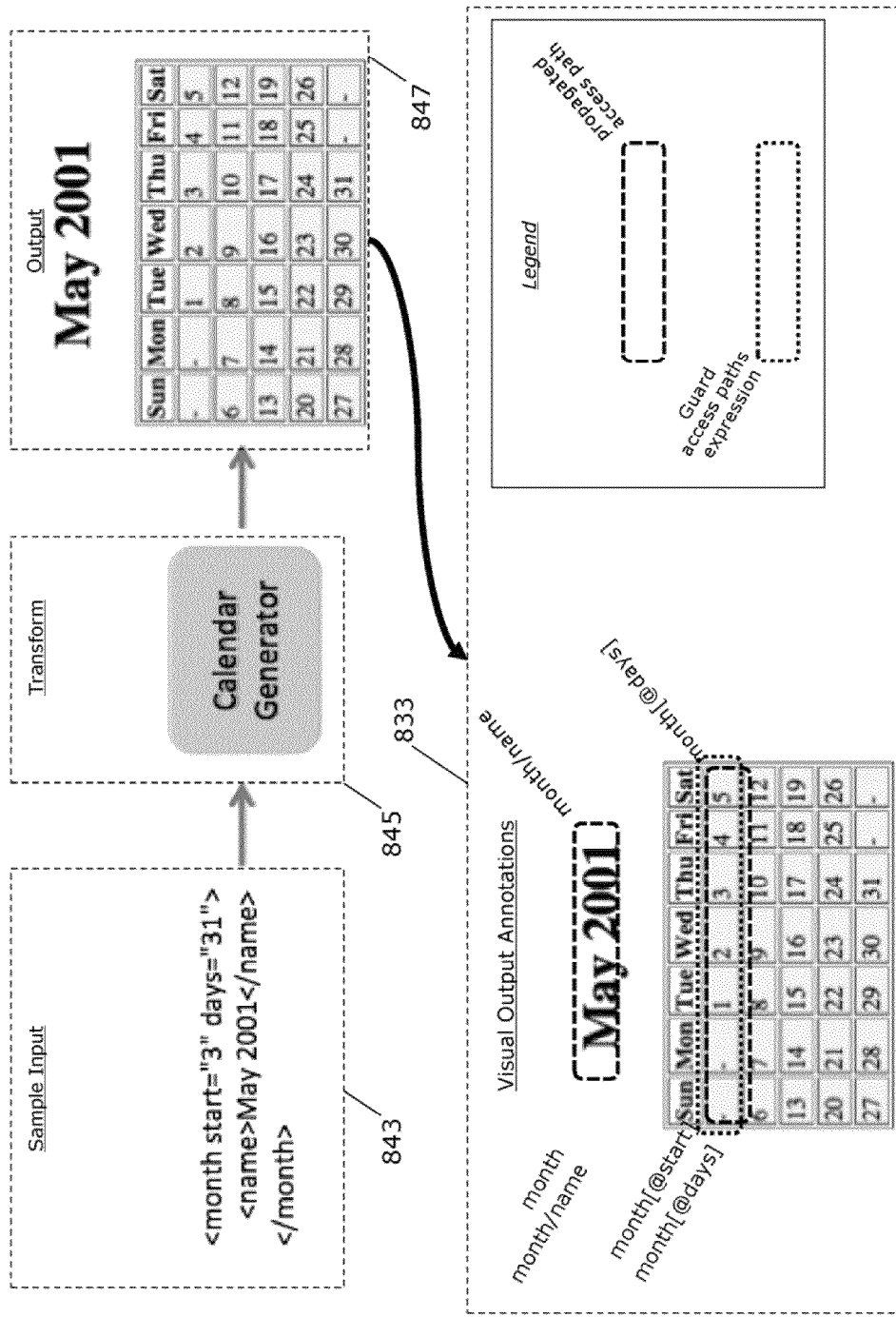
FIG. 8 provides an illustrative example of sample input transformed into visual output.

FIG. 8 provides an illustrative example of sample input 843 transformed into visual output 833, in accordance with at least one embodiment of the invention. For instance, sample input 843 related to the month of May 2001 can be fed to a calendar generator 845 (itself employing a transform) which yields the output 847 shown. Visual output annotations (in accordance with visual output 833) can also be added in a manner such as that shown, so as to impart an appreciation of the link between aspects of the input and output.

Figure 9:
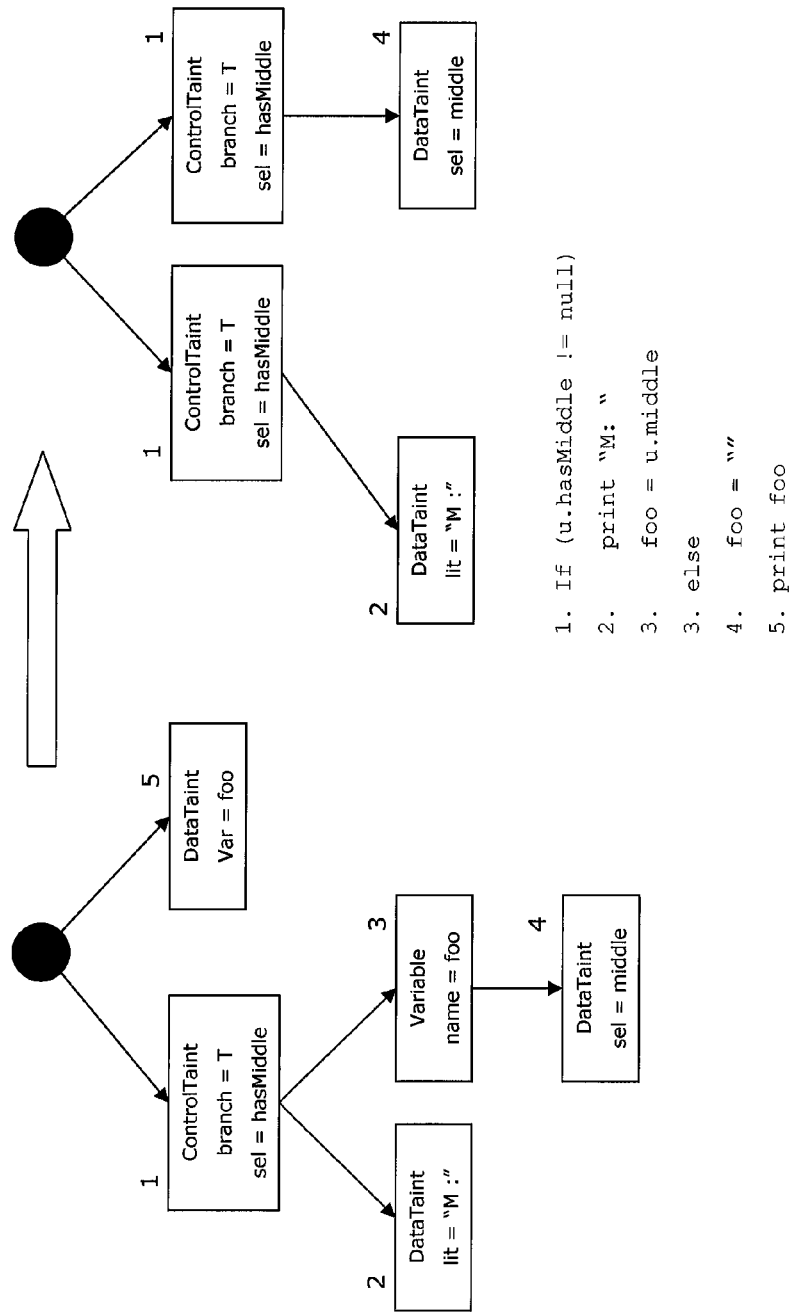
FIG. 9 schematically illustrates traces in the course of variable propagation.

FIG. 9 schematically illustrates traces in the course of variable propagation, in a manner to be described more fully herebelow.

The disclosure now turns to a more detailed discussion of aspects associated with at least one embodiment of the invention. Continued reference may be made to FIGS. 1-9.

In accordance with at least one embodiment of the invention, it can be appreciated that intuitively, the operational abstraction (e.g., as indicated at 437 in FIG. 4) illustrates the transform output, and captures all influences of input-model entities on the output. An input-model entity may contribute to an output fragment by being propagated to the output, or it may control the generation of an output fragment. The abstraction also retains the relevant structure of the transform, while removing irrelevant parts. A metamodel access path is a path in the model starting at the root element and terminating at an element or attribute. For example, userData.user and userData.user.middle are access paths in the input model of PrintUser. The vocabulary of a transform is restricted to string literals (that can appear in the output) and input-model entities (represented as access paths).

In accordance with at least one embodiment of the invention, the transform abstraction 409 in FIG. 4 presents the operational abstraction of PrintUser. As can be seen, the abstraction contains the literals (enclosed in quotes) and input-model entities (shown as access paths) that can occur in the output. Moreover, the abstraction has repeating fragments (shown as ψ[ . . . ]*) and conditional fragments (shown in the guarded notation G[ . . . ]). Such an abstraction captures the essence of the transformation logic, thereby, making it easy for the transform user to understand the logic. For example, the user can see that the input-model attribute user.middle occurs in the output if the attribute user.hasMiddle is set to true (line 2). Similarly, the abstraction shows that the transform prints information about zero or more children elements (lines 6-12).

Moreover, in accordance with at least one embodiment of the invention, it can be noted that the internal implementation details of the transform are abstracted away. For instance, the transform code tracks the number of children of a user in the internal variable totalChildren, and uses the variable to create a conditional output fragment (line 17 in sample transform 435). This implementation detail is irrelevant from the user's perspective. Instead, the pertinent information for the user is that the conditional fragment "User has children" is generated based on the number of <children> elements in the input. This is precisely represented in line 13 of the abstraction 409. The abstraction captures the transform structure. In that sense, it is a projection of the transform, created after propagation of data from the input to output.

In accordance with at least one embodiment of the invention, to generate a complete abstraction, all acyclic paths through the transform are explored. Because this can be prohibitively expensive, a selective path-enumeration technique, as broadly contemplated herein, can be applied that also guarantees that the abstraction is complete. The associated technique is based on the observation that the full combination of paths induced by some sequence of conditional statements is unnecessary.

In accordance with at least one embodiment of the invention, selective path exploration is formally characterized based on dependence chains that start at an input-model entity and terminate at an output statement. A dependence chain is a sequence of statements $<s_1, s_2, \ldots, s_k>(k>1)$, such that $s_1$ is an input statement; $s_k$ is an output statement; for $1 \leq i \leq k-2$, $s_{i+1}$ is data-dependent on $s_i$; and either $s_k$ is data-dependent on $s_{k-1}$ or $s_k$ is control dependent on $s_{k-1}$. For example, in PrintUser, <8,16,17> is a dependence chain: statement 8 is an input statement, statement 17 is an output statement, statement 16 is data-dependent on statement 8, and statement 17 is control dependent on statement 16.

It can be noted, in accordance with at least one embodiment of the invention, that a combinatorial blowup in the number of paths occurs in the presence of sequences of conditional statements. Such sequences are defined herein in terms of hammock graphs and peer-level hammocks. A hammock graph H is a sub-graph of a control-flow graph G with a unique entry node e∈H and a unique exit node x∉H such that (1) all edges from (G−H) to H go to e and (2) all edges from H to (G−H) H to $(G-H)$ go to x.

To illustrate this, in accordance with at least one embodiment of the invention, FIG. 5 displays a control-flow graph 539 for the functions in PrintUser. A CFG for a function contains nodes that represent statements and edges that represent the flow of control between statements. As shown in FIG. 5, five hammock graphs ($H_5$, $H_8$, $H_{10}$, $H_{16}$, $H_{19}$) are highlighted; the subscript of a hammock represents the hammock entry node. For example, for $H_{19}$, conditional node 19 is the entry node and node 21 is the exit node.

In accordance with at least one embodiment of the invention, to define peer-level hammocks, let $\{H_1, H_2, \ldots H_k\}$, (k>1), be a set of hammocks with entry nodes $e_1, e_2, \ldots e_k$. The hammocks in the set are peer-level hammocks if and only if the $e_i$, ($1 \leq i \leq k$) have the same control dependence. In control-flow graph 539 in FIG. 5, then, $H_5$ and $H_{16}$ are peer-level hammocks because their entry nodes (nodes 5 and 16) have the same control dependence: (1, T). Peer-level hammocks can occur in different functions. To identify such peers, interprocedural control dependencies are computed. One of the sources of interprocedural control dependence is call relations, which cause a statement in a called function to be control dependent on statements in the calling functions. In PrintUser, statement 19 is control-dependent on (1, T), through call site 3, and on (8, T) through call site 9. Because statement 19 (the entry node of hammock $H_{19}$) has the same control dependence as the entry nodes of $H_5$ and $H_{16}$, it is a peer of those hammocks. Similarly, $H_{19}$ and $H_{10}$ are peer-level hammocks because of the common control dependence (8, T).

In accordance with at least one embodiment of the invention, it can be appreciated that the presence of peer-level hammocks causes the exponential number of paths to be analyzed. But, not all peer-level hammocks have to be analyzed completely; some hammocks can be omitted because they do not influence the output. Further, some hammocks can be traversed independently of their peers, thereby, avoiding the exponential blowup in the analyzed paths.

In accordance with at least one embodiment of the invention, it can be considered that a hammock H is an irrelevant hammock if and only if H contains no output statement and H has no incoming or outgoing dependence chain. Further, it can be considered that a hammock H is an independent hammock if and only if H contains an output statement and H has no incoming or outgoing dependence chain.

As such, in accordance with at least one embodiment of the invention, an irrelevant hammock has no influence on the output, either directly or indirectly. Therefore, paths through such a hammock need not be explored. An independent hammock influences output directly because it contains output statements, so paths in the hammock have to be explored. However, because such a hammock has no incoming/outgoing dependencies, it need not be explored in combination with its peers; in other words, it can be explored separately from its peers. In control-flow graph 539 in FIG. 5, $H_8$, $H_{10}$, and $H_{19}$ are independent hammocks, which can be explored independently from their peers. There are no irrelevant hammocks in control-flow graph 539.

In accordance with at least one embodiment of the invention, it can be considered that a hammock H is a dependent hammock if and only if H has an incoming or outgoing dependence chain. In control-flow graph 539 in FIG. 5, $H_5$ and $H_{16}$ are dependent hammocks because there is a data dependence, via variable totalChildren, between them. Dependent hammocks can require the traversal of combinations of paths. However, the exploration of all paths (in this case, 16 paths) may not be optimal. Because $H_5$ contains independent hammocks $H_8$, $H_{10}$, and $H_{19}$, which would be explored separately, they are irrelevant for the combined traversal of $H_5$ and $H_{16}$. Instead of 16 paths, only four paths (two each in $H_5$ and $H_{16}$) need to be explored. Thus, independent hammocks also have the property that they are irrelevant with respect to their containing hammocks.

For PrintUser, in accordance with at least one embodiment of the invention, exhaustive enumeration would result in 33 paths, whereas selective enumeration results in 14 paths only; namely, these are represented by four paths through $H_{19}$ via the two calls to printName, two paths in $H_8$, three paths in $H_{10}$, four paths in the combined exploration of $H_5$ and $H_{16}$, and one path along branch (1, F).

In accordance with at least one embodiment of the invention, a path-enumeration algorithm includes three main steps. In a first step, the algorithm performs two tasks. First, it identifies all hammocks in the transform, by analyzing each function. Secondly, it computes the set D of dependence chains. For each output statement s, it computes backward transitive data dependencies to identify the chain $<s_1, s_2, \ldots, s>$. If $s_1$ is an input statement, it adds the chain to D. Then, it identifies the control dependence of s, e.g., $s_p$, and computes backward transitive data dependencies for $s_p$: $<s_1, s_2, \ldots, s_p>$. If $s_1$ is an input statement, it adds the chain to D.

In a second path-enumeration step, in accordance with at least one embodiment of the invention, the algorithm classifies hammocks as irrelevant or independent. If a hammock H contains no output statement and no statement in H appears in any dependence chain in D, H is classified as an irrelevant hammock. If H contains an output statement and no statement in H appears in any dependence chain in D, H is classified as an independent hammock. Thus, in this step, $H_8$, $H_{10}$, and $H_{19}$ are classified as independent hammocks. The remaining hammocks are dependent hammocks whose peer sequences need to be computed.

In a third and final path-enumeration step, in accordance with at least one embodiment of the invention, the algorithm iteratively identifies peer-level hammocks and selectively expands the paths. A path is represented as a sequence of branches, hammocks, and calls. Thus, the initial path in function main( ) is $\pi_1=((1,T), 3, H_5, H_{16})$. In the second iteration, the algorithm expands call node 3, which results in $\pi_2=((1, T), H_{19}, H_5, H_{16})$. Because there are no call nodes in the path, the algorithm has identified $H_{19}$, $H_5$, and $H_{16}$ as peer-level hammocks.

In accordance with at least one embodiment of the invention, the algorithm expands each of these hammocks to discover additional paths, call sites, and hammocks. $H_{19}$ is an independent hammock; therefore, it is expanded separately, resulting in the computation of two paths through that hammock. Because $H_5$ and $H_{16}$ are dependent, they must be expanded together. The expansion of $H_{16}$ results in two paths. The expansion of $H_5$ results in paths $\pi_3=((5,T), H_8)$ and $\pi_4=((5,F))$. Because $H_8$ is an independent hammock, it is irrelevant with respect to $H_5$ (the containing hammock) and can be expanded separately. Thus, the expansion of $H_5$ completes with the identification of $\pi_3$ and $\pi_4$; together with its dependent peer, $H_{16}$, four path combinations are identified. The expansion of $H_8$ proceeds in a similar manner. Additionally, the path-enumeration algorithm handles recursion to ensure that an interprocedural cycle induced by recursive calls is traversed only once.

In accordance with at least one embodiment of the invention, another phase includes dynamic analysis, which explores transform paths by forcing execution to proceed along a desired path and collects runtime information. This technique is further referred to herein as forced path exploration (FPE). FPE works by modifying the outcome of a conditional statement, at runtime, to guide the execution along a specific branch from the conditional.

In accordance with at least one embodiment of the invention, to traverse a particular path, a transform is instrumented and executed on an empty input model. The path to be explored is represented as a sequence $\pi=(n_1, n_2, \ldots, n_k)$, where the $n_i$ represent either branches or hammocks. The execution proceeds normally until it reaches $n_1$. After that, execution proceeds either normally or in a forced manner depending on the type of $n_i$. If $n_i=(s_p, L)$ is a branch, the instrumentation probes discard the outcome of $s_p$ and force the traversal along the branch labeled L. If $n_i=H$ is a hammock, the instrumentation probes let execution proceed normally through H: i.e., the normal outcome of the entry node of H determines the traversed branch. Because that H is an irrelevant hammock, no specific path needs to be taken through it. In this manner, a forced execution includes interleaved normal and coerced branch outcomes.

In accordance with at least one embodiment of the invention, in addition to the probes for altering branch outcomes, the aforementioned technique adds probes for collecting runtime information. The probes capture all accesses of input-model entities and generation of output, and flow across data and control dependencies, in the manner of dynamic taint analysis. (For background information relating to dynamic taint analysis, the following publications can be consulted: P. Dhoolia et al., "Debugging model transformation failures using dynamic tainting," *In Proceedings of the 24th European Conference on Object-Oriented Programming*, pp. 26-51, June 2010; and S. Mani et al., "Automated support for repairing input-model faults," *In Proceedings of the 25th International Conference on Automated Software Engineering*, pp. 195-204, September 2010.) Essentially, the probes generate trace information at each assignment, conditional, and output statement. A key feature of the dynamic analysis is that it distinguishes different types of taint marks: data taints, control taints, and loop taints. A data taint is propagated at assignments and statements that directly, or indirectly, construct an output fragment. A control taint is propagated at conditional statements to the output fragments constructed in the scope of the conditional statements. A loop taint is propagated, in a similar manner, at looping constructs.

In accordance with at least one embodiment of the invention, taint log 607 in FIG. 6 shows the trace generated for path (18, 19, 20, 21) in function printName( ) when printName( ) is invoked from call site 3 in main( ) (see the sample transform 435 in FIG. 4). In the trace, <DataTaint> element captures information about the input-model entities that are propagated to output statements via assignments. Thus, lines1-3 of the trace record the output of userData.user.first in line 18 of printName( ); similarly, lines 12-14 of the trace record the printing of userData.user.last in line 21. A <ControlTaint> element captures information about the predicate in a conditional statement: the left-hand and right-hand expressions (which could represent an input-model entity or a string literal), and the comparison operator. Lines 4-11 capture information about statements 19-20 in printName( ). (see FIG. 5). Note that the nested <DataTaint> element (trace lines 8-10) illustrates that userData.user.last is guarded by the condition in statement 19.

In accordance with at least one embodiment of the invention, during forced exploration, the transform executes on an empty input model. Therefore, it attempts to access non-existing input-model elements, which can cause the runtime environment to raise null-pointer exceptions. To handle such cases, appropriate instrumentation that intercepts (e.g., via aspect weaving) references to input-model elements and construct empty objects on-the-fly is applied.

In accordance with at least one embodiment of the invention, an additional phase combines individual execution traces (as illustratively set forth hereinabove) to synthesize the operational abstraction. An associated algorithm first merges the individual execution traces, and then converts the merged trace to the abstraction.

In accordance with at least one embodiment of the invention, to merge the individual traces, they are preprocessed to make them suitable for merging. First, this step removes from the trace each control-taint subtree that does not correspond to a coerced branch outcome. Inasmuch as FPE involves interleaved normal and coerced branch evaluations, normal execution occurs through a hammock H whose exploration is not pertinent for the particular path. Thus, information captured in the trace within the scope of conditionals that evaluated normally is irrelevant and, consequently, removed.

In accordance with at least one embodiment of the invention, there is a resolution of trace entries where variables occur because the vocabulary of the abstraction is restricted to contain access paths and literals only. Intuitively, in this step, the access path $\psi$ at an assignment v=$\psi$ is propagated forward to the uses of v. To illustrate, the code fragment and the trace representations shown in FIG. 9 may be considered. The trace on the left is the one generated after the execution of the true branch of the if condition in line 1. Node 3 is a <variable> node, which represents the variable assignment in line 3. Node 4 is a <DataTaint> node representing the access path u.middle. Node 5 is a <DataTaint> node for the output in line 5. The algorithm replaces node 5 with the path (1,4): the modified trace represents the case that u.middle is printed at line 5 under the condition (1, T). In general, the path that replaces a variable-use node $n_{vu}$ includes the <DataTaint> node $n_{dt}$ (node 4 in FIG. 9) and all control-taint ancestors of $n_{dt}$ until the least common ancestor of $n_{dt}$ and $n_{vu}$. The algorithm performs the propagation transitively.

In accordance with at least one embodiment of the invention, after the traces have been preprocessed, merging is performed as a simple tree-merge operation, as illustrated in FIG. 9. The tree on the left shows the trace fragment generated for the path traversed along branches (1, T), (5,T), (8, T), (10, T). Similarly, the tree in the center is the trace fragment for the path traversed along (1, T), (5, T), (8, T), (10, F), (12, T). The tree on the right results from merging these two trees. The merged trace captures the executions of both the paths.

In accordance with at least one embodiment of the invention, an algorithm for creating the operational abstraction operates on the merged trace. The algorithm traverses the merged trace in a breadth-first manner and processes each node based on its type, using the following rules, to generate parts of the abstraction:

For a data taint, an access path $\psi$ or a literal (l) is created in the abstraction.
For a control taint, a guard (G[ . . . ]) is created from the relational expression captured in the taint information.
For a loop taint, a repeating fragment ($\psi$[ . . . ]*) is created.
For a path of consecutive control taints, a conjunction of guards ($G_1 \char94 G_2$) is created.
For two sibling control taints for the same statement, but different branches, alternative output fragments ($O_F \vee O_F$) are created.

Additionally, in accordance with at least one embodiment of the invention, to create the access paths, the algorithm propagates the select values from loop taint nodes to all descendant nodes. To illustrate, consider the merged tree shown on the right in the merging representation 741 in FIG. 7. The algorithm traverses the tree starting at node 1, where it creates a repeating fragment $\psi_1$[ . . . ]* in the output, where $\psi_1$=user. Next, at node 2, it creates the guard $G_1$: user.children≠null. To create the complete access path, the algorithm propagates the select value from node 1 (a loop node) to node 2. Next, at node 3, a nested repeating fragment $\psi_2$[ . . . ]* is created. At this point, the abstraction is $\psi_1[G_1[\psi_2[ \ldots ]*]]*$.

In accordance with at least one embodiment of the invention, on encountering the sibling control taint nodes 4 and 5, the algorithm creates two alternative guarded fragments: $G_2$[ . . . ]∨ $G_3$[ . . . ], where $G_2$: user.children.user.gender="M" and $G_3$:

user.children.user.gender≠"M". At node 6, $G_2$[ ... ] is expanded to $G_2$["Boy,"] and, at node 7, the fragment is recomputed as $G_2$ ["Boy," user.children.user.age]. At node 8, the conjunction of $G_3$ and a new guard $G_4$ is created. After all the nodes have been processed, the computed abstraction is $\psi_1[G_1[\psi_2[G_2["Boy," \quad \psi_3]\vee(G_3\wedge G_4)["Girl," \quad \psi_4]]*]]*$, where:

$\psi_1$:user
$\psi_2$:user.children
$G_1$:user.children≠null
$G_2$:user.children.user.gender="M"
$G_3$:user.children.user.gender≠"M"
$G_4$:user.children.user.gender="F"
$\psi_3=\psi_4$=user.children.user.age The complete abstraction of PrintUser is indicated at 409 in FIG. 4.

Figure 10:
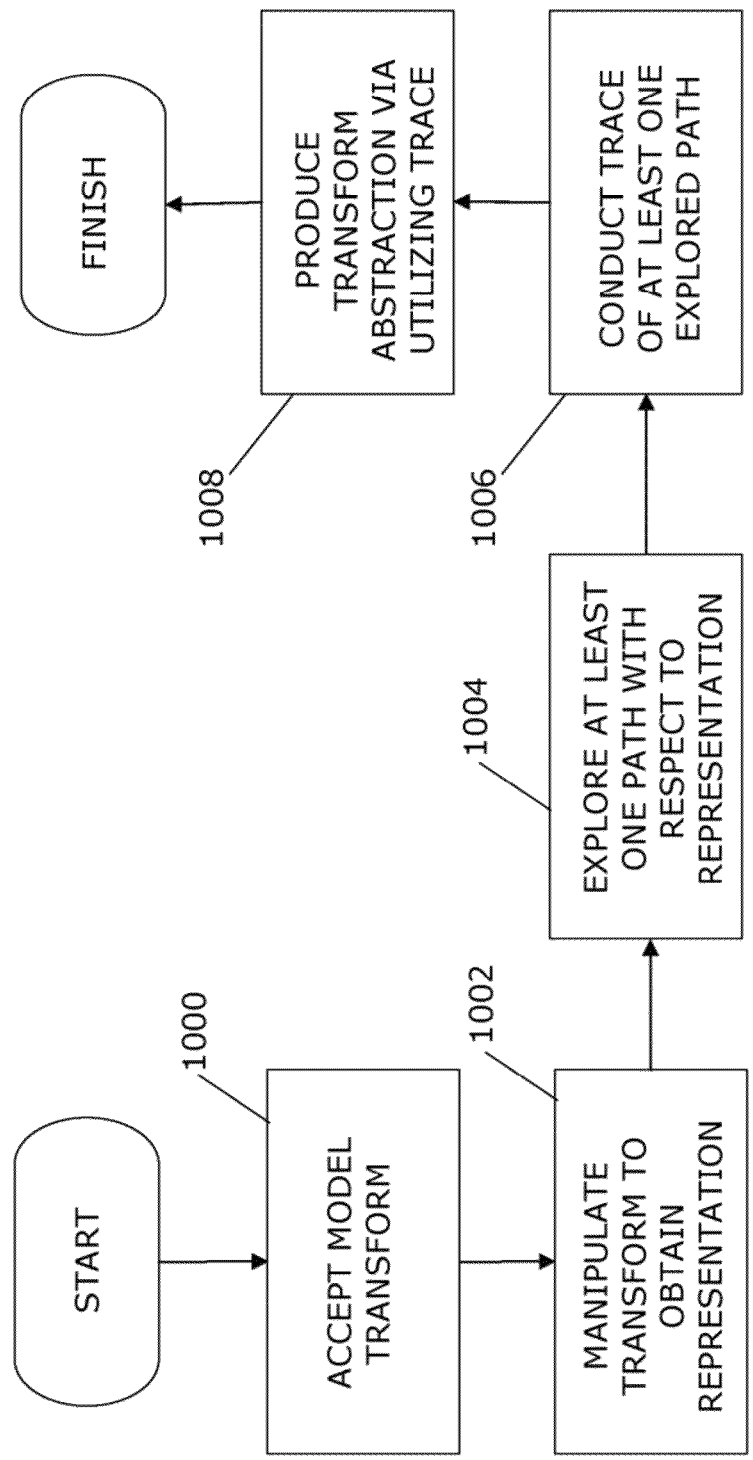
FIG. 10 sets forth a process more generally for generating a transform abstraction.

FIG. 10 sets forth a process more generally for employing a software model transform, in accordance with at least one embodiment of the invention. It should be appreciated that a process such as that broadly illustrated in FIG. 10 can be carried out on essentially any suitable computer system or set of computer systems, which may, by way of an illustrative and non-restrictive example, include a system such as that indicated at 12' in FIG. 11. In accordance with an example embodiment, most if not all of the process steps discussed with respect to FIG. 10 can be performed by way of a processing unit or units and system memory such as those indicated, respectively, at 16' and 28' in FIG. 11.

As shown in FIG. 10, in accordance with at least one embodiment of the invention, a software model transform is accepted (1000), and the transform is manipulated to obtain a transform representation (1002). At least one functional path is explored with respect to the transform representation (1004). A trace is conducted of at least one explored path (1006), and an abstraction of the transform is produced via utilizing the trace, the abstraction comprising a simplified semantic view of the transform (1008).

Figure 11:
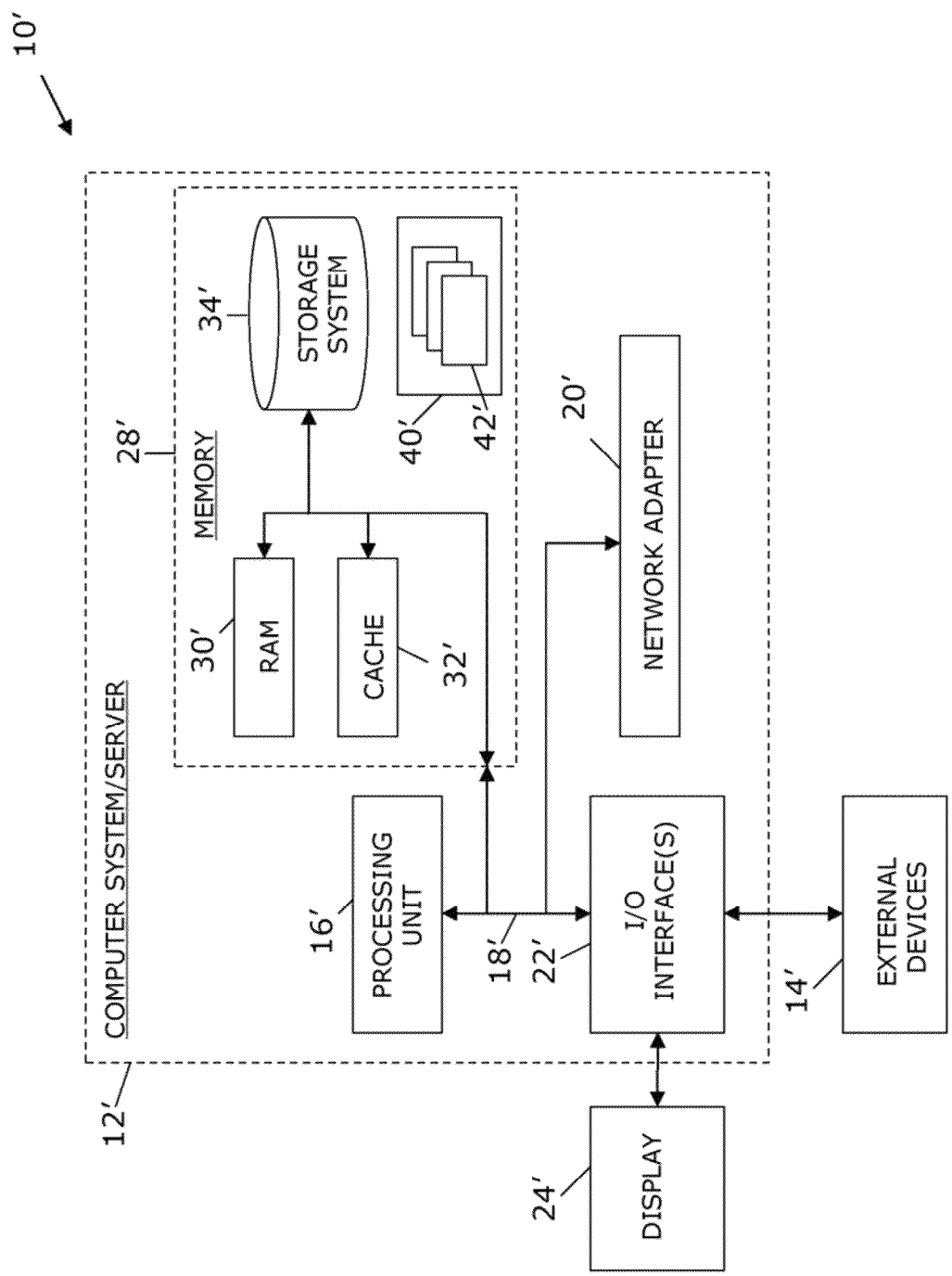
FIG. 11 illustrates a computer system.

Referring now to FIG. 11, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of employing a software model transform, said method comprising:
  utilizing a processor to execute computer code configured to perform the steps of:
  accepting a software model transform;
  manipulating the transform to obtain a transform representation;
  producing an abstraction of the transform via:
    forcibly exploring a plurality of paths one by one via a blank input model, with respect to the transform representation;

wherein said exploring comprises undertaking selective path exploration which is based on dependence chains starting at an input-model entity and terminating at an output statement;
conducting a trace of at least one explored path via producing at least one taint log, wherein the at least one taint log includes a trace of at least one explored path, the trace including loop, data and control taint information; and
producing an abstraction of the transform via utilizing the trace, the abstraction comprising a simplified semantic view of the transform;
wherein the abstraction conveys: literals, at least one input-model entity, repeating fragments and conditional fragments, output fragments and guards;
wherein each literal is created for a data taint in the trace;
wherein each conditional fragment is created for a control taint in the trace, from a relational expression captured in the control taint information;
wherein each repeating fragment is created for a loop taint in the trace;
wherein, for a path of consecutive control taints, a conjunction of guards is created; and
wherein, for two sibling control taints for the same statement but different branches, alternative output fragments are created.

2. The method according to claim 1, wherein:
said accepting comprises accepting a software model transform expressed in transform language;
said manipulating comprises translating the transform language to produce a raw transform representation expressed in a host language, the host language being different from the transform language.

3. The method according to claim 1, wherein said exploring comprises exploring a plurality of paths with independent single peer hammocks.

4. The method according to claim 1, wherein the at least one taint log comprises at least one data element, at least one conditional element and at least one loop element.

5. The method according to claim 1, wherein said producing comprises merging data from the at least one taint log, corresponding to a plurality of the paths, and creating a unified transform abstraction.

6. An apparatus for employing a software model transform, said apparatus comprising:
at least one processor; and
a computer readable storage medium having computer readable program code embodied therewith and executable by the at least one processor, the computer readable program code comprising:
computer readable program code configured to accept a software model transform;
computer readable program code configured to manipulate the transform to obtain a transform representation;
computer readable program code configured to produce an abstraction of the transform via:
forcibly exploring a plurality of paths one by one via a blank input model, with respect to the transform representation;
wherein the exploring comprises undertaking selective path exploration which is based on dependence chains starting at an input-model entity and terminating at an output statement;
conducting a trace of at least one explored path via producing at least one taint log, wherein the at least one taint log includes a trace of at least one explored path, the trace including loop, data and control taint information; and
producing an abstraction of the transform via utilizing the trace, the abstraction comprising a simplified semantic view of the transform;
wherein the abstraction conveys: literals, at least one input-model entity, repeating fragments and conditional fragments, output fragments and guards;
wherein each literal is created for a data taint in the trace;
wherein each conditional fragment is created for a control taint in the trace, from a relational expression captured in the control taint information;
wherein each repeating fragment is created for a loop taint in the trace;
wherein, for a path of consecutive control taints, a conjunction of guards is created; and
wherein, for two sibling control taints for the same statement but different branches, alternative output fragments are created.

7. A computer program product for employing a software model transform, said computer program product comprising:
a non-transitory computer readable storage medium having computer readable program code embodied therewith, the computer readable program code comprising:
computer readable program code configured to accept a software model transform;
computer readable program code configured to manipulate the transform to obtain a transform representation;
computer readable program code configured to produce an abstraction of the transform via:
forcibly exploring a plurality of paths one by one via a blank input model, with respect to the transform representation;
wherein the exploring comprises undertaking selective path exploration which is based on dependence chains starting at an input-model entity and terminating at an output statement;
conducting a trace of at least one explored path via producing at least one taint log, wherein the at least one taint log includes a trace of at least one explored path, the trace including loop, data and control taint information; and
producing an abstraction of the transform via utilizing the trace, the abstraction comprising a simplified semantic view of the transform;
wherein the abstraction conveys: literals, at least one input-model entity, repeating fragments and conditional fragments, output fragments and guards;
wherein each literal is created for a data taint in the trace;
wherein each conditional fragment is created for a control taint in the trace, from a relational expression captured in the control taint information;
wherein each repeating fragment is created for a loop taint in the trace;
wherein, for a path of consecutive control taints, a conjunction of guards is created; and
wherein, for two sibling control taints for the same statement but different branches, alternative output fragments are created.

8. The computer program product according to claim 7, wherein said computer readable program code is configured to:
accept a software model transform expressed in transform language; and
translate the transform language to produce a raw transform representation expressed in a host language, the host language being different from the transform language.

9. The computer program product according to claim 7, wherein said computer readable program code is configured to explore a plurality of paths with independent single peer hammocks.

10. The computer program product according to claim 7, wherein said computer readable program code is configured to merge data from the at least one taint log, corresponding to a plurality of the paths, and create a unified transform abstraction.

11. A method comprising:
accepting a software model transform;
manipulating the transform to obtain a raw transform representation;
producing an abstraction of the transform via:
conducting forced path exploration with respect to a plurality of paths found in the raw transform representation;
wherein said conducting of forced path exploration comprises:
   forcibly exploring the plurality of paths one by one via a blank input model, with respect to the raw transform representation; and
   undertaking selective path exploration which is based on dependence chains starting at an input-model entity and terminating at an output statement;
conducting a trace of at least one explored path via producing a taint log, wherein the at least one taint log includes a trace of at least one explored path, the trace including loop, data and control taint information; and
producing an abstraction of the transform via utilizing the taint log, the abstraction comprising a simplified semantic view of the transform;
wherein the abstraction conveys: literals, at least one input-model entity, repeating fragments and conditional fragments, output fragments and guards;
wherein each literal is created for a data taint in the trace;
wherein each conditional fragment is created for a control taint in the trace, from a relational expression captured in the control taint information;
wherein each repeating fragment is created for a loop taint in the trace;
wherein, for a path of consecutive control taints, a conjunction of guards is created; and
wherein, for two sibling control taints for the same statement but different branches, alternative output fragments are created.

* * * * *